United States Patent Office 3,023,818
Patented Mar. 6, 1962

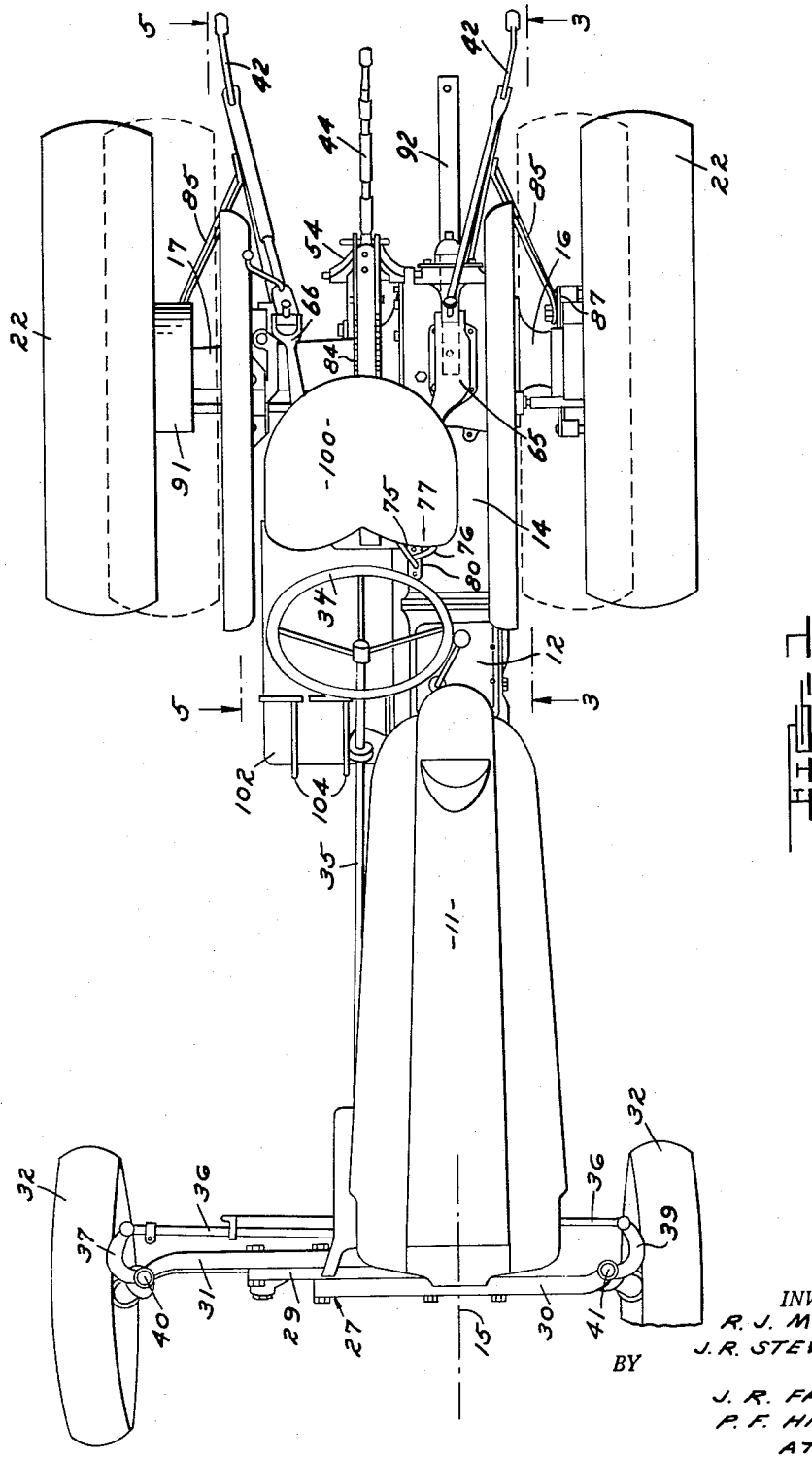

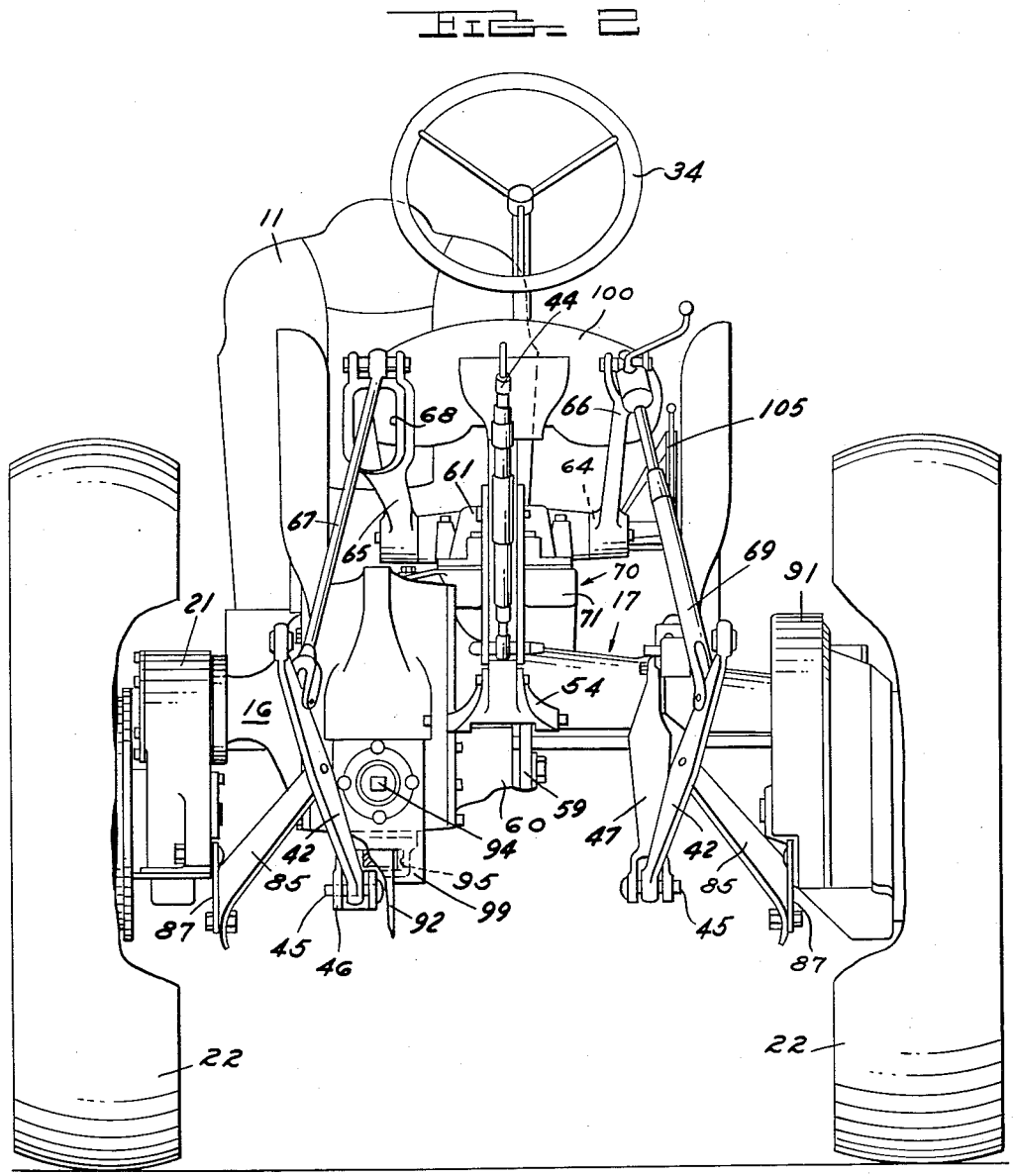

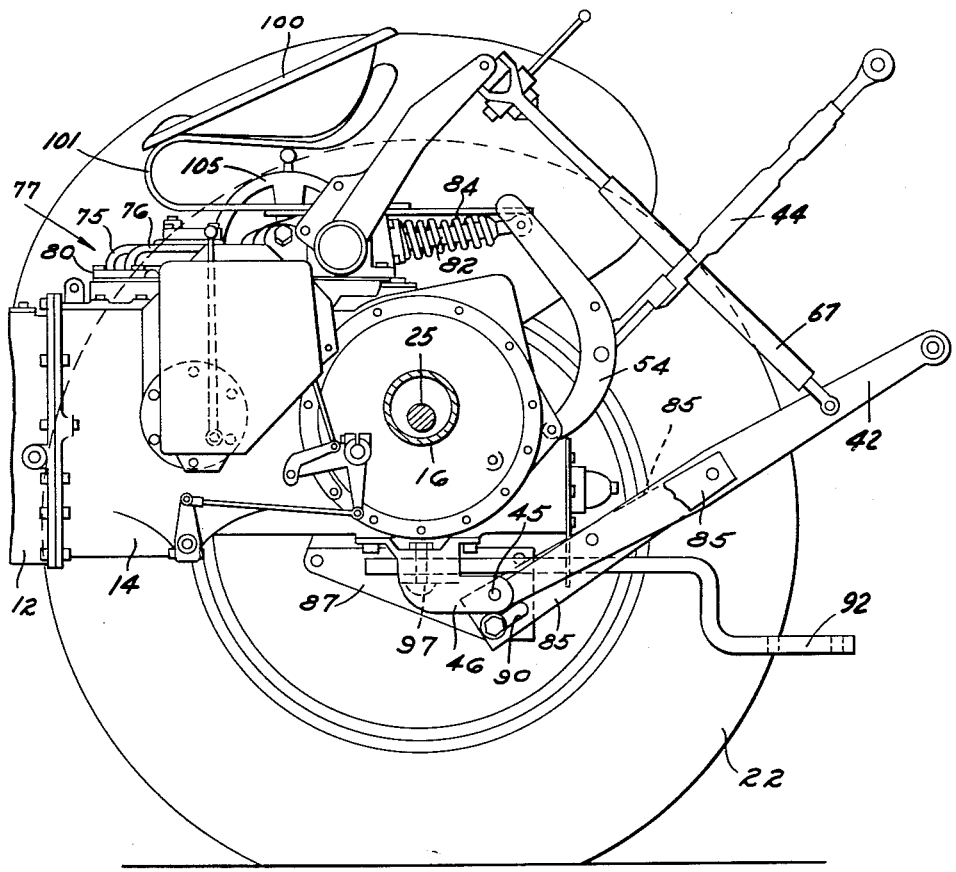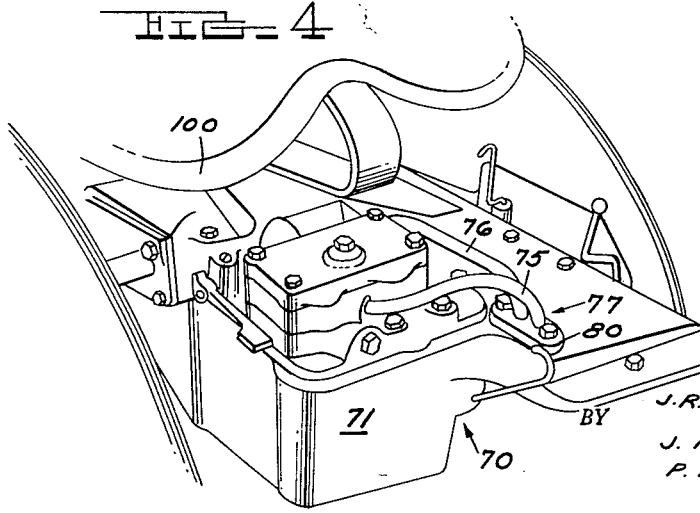

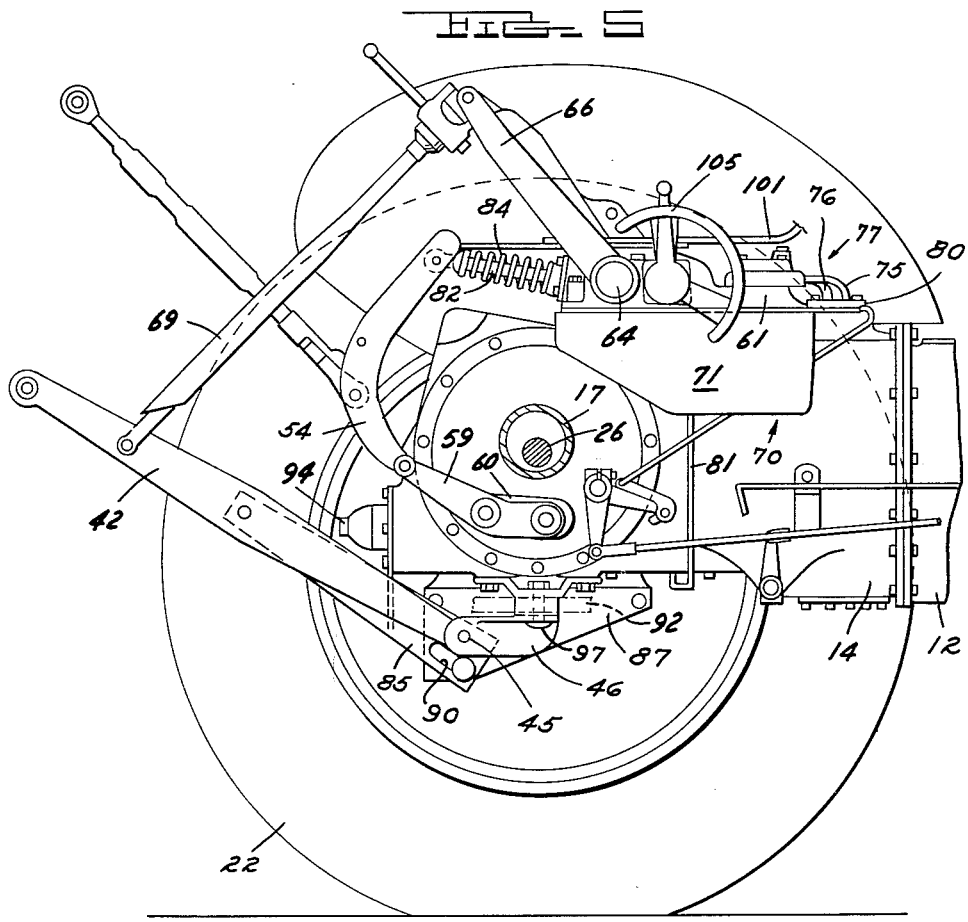

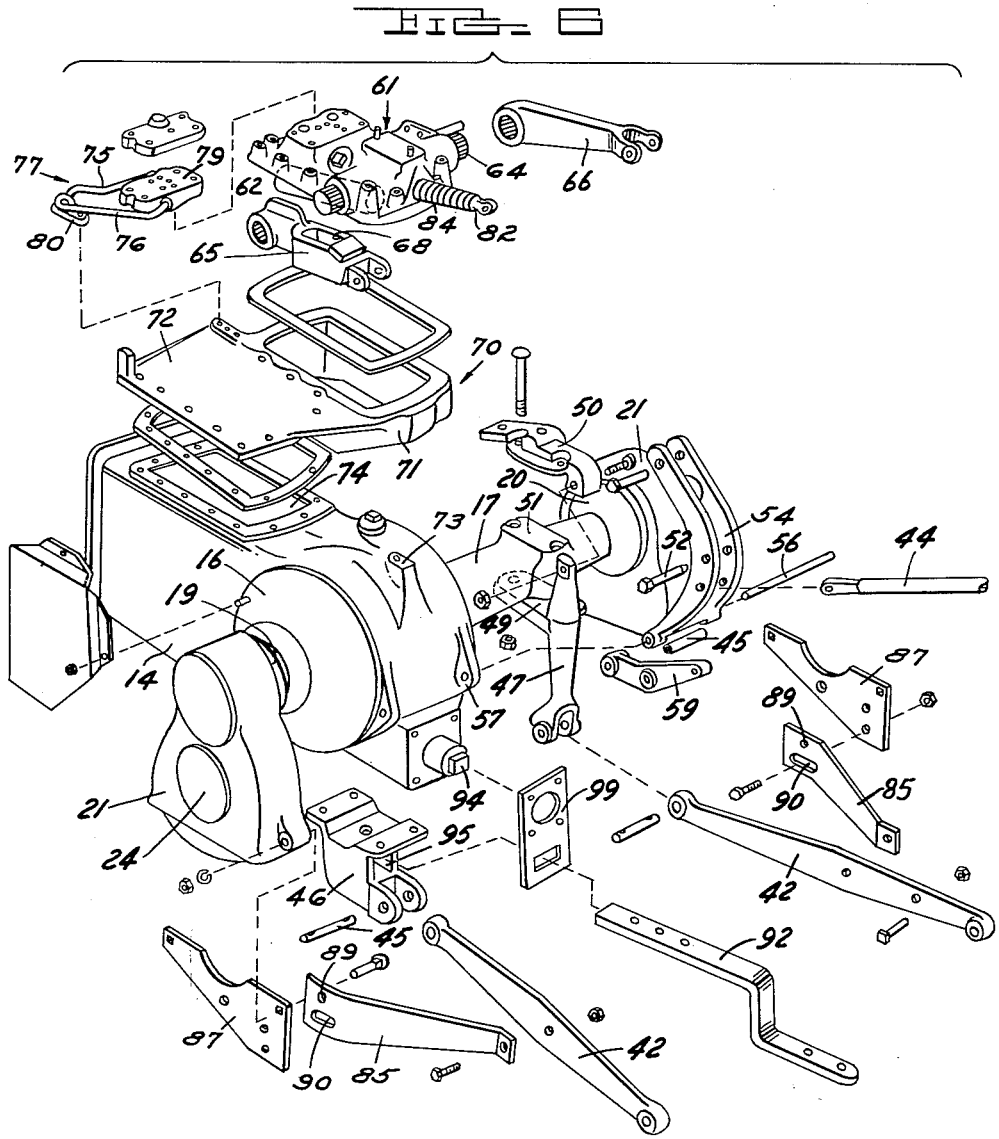

3,023,818
OFFSET TRACTOR WITH MEANS FOR CARRYING AND OPERATING A HYDRAULIC LIFT ASSEMBLY
Raymond J. Miller, Detroit, and James R. Stevenson, Farmington, Mich., assignors to Ford Motor Company, Dearborn, Mich., a corporation of Delaware
Filed May 6, 1959, Ser. No. 811,300
6 Claims. (Cl. 172—439)

This invention relates to tractors, and more specifically to offset tractors, in which the transmission and center housing of the tractor are offset to one side to permit increased ground visibility for cultivation of crops.

In the tractor in which the present invention is embodied, the engine transmission and center housing of the tractor are offset to the left of the center line of the tractor, the left rear axle housing or trumpet being much shorter than the right rear axle housing. The steering and operating controls of the tractor are displaced to the right rather than being centered on the line of the engine, transmission and center housing, and, instead, are generally centered with the rear wheels so as to provide a tractor in which the operator can look downwardly along the right side of the tractor for careful one-row crop cultivation.

Among the features of the tractor of the present invention is a standard three-point lift type implement hitch in which the power lift draft links are carried from the tractor rear axle housing and the hydraulic lift assembly is carried from the top of the center housing in a simple and improved manner, the three-point hitch being centered with the rear axle and being offset to the right of the center housing. A further feature of the invention is the use of a combined member secured to the underside of the center housing adapted to receive the forward end of a drawbar centered under the PTO shaft and also pivotally mounting the forward end of the left lower draft link.

Among the objects of the present invention are to provide an offset tractor of improved construction having a three-point hitch for implements which is offset from the center housing; to provide such tractor having an improved and simplified mounting for a hydraulic lift assembly and for the lower draft links; to provide such a tractor that utilizes, insofar as practicable, parts from standard model tractors; and generally to improve tractors of the type described.

Other objects and objects relating to details of construction and operation will become more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 1 is a top plan view of an offset tractor embodying the improvements of the present invention, a portion of one of the front wheels being broken away for convenience of illustration;

FIGURE 2 is a rear elevation of a tractor of FIGURE 1, portions of the rear wheels and of the swinging drawbar being broken away for convenience of illustration;

FIGURE 3 is a vertical section of the rear portion of the tractor, taken generally along the line 3—3 of FIGURE 1, the left fender being omitted;

FIGURE 4 is an isometric view of portions of the tractor, including the center housing and hydraulic lift mechanism, observed from a position in front of the right rear wheel of the tractor;

FIGURE 5 is a vertical section of the rear portion of the tractor taken generally along line 5—5 of FIGURE 1, the right fender and seat being broken away or omitted; and FIGURE 6 is an exploded isometric view of the tractor center housing, rear axle housings, hydraulic lift mechanism and associated parts.

Referring now to the drawings, the tractor of the present invention has an engine 11, transmission 12, and center housing 14 which are generally centered along a longitudinal line or axis 15 of the tractor. A pair of rear axle housings 16 and 17 are connected to the left and right sides of the center housing 14, the left housing or trumpet being much shorter than the right housing so that the axis 15 of the tractor is offset relative to the outer ends 19 and 20 of the rear axle housings 16 and 17.

A drop housing 21 is secured to the outer end of each axle housing 16 and 17, the drop housings 21, 21 projecting downwardly and providing additional ground clearance for the rear axle housing. The rear wheels 22, 22 of the tractor are supported on the outer ends of rear axle shafts (one shaft 24 shown) which are carried within the drop housings 21, 21. A pair of left and right final drive shafts 25 and 26 are received within the left and right axle housings 16, 17, the left-hand shaft being shorter than the right-hand shaft in accord with the length of the axle housings. The rear wheels 22 are bolted to the outer ends of the rear axle shafts 24, 24 in a customary manner, the rear wheels 22, 22 preferably being of the adjustable gauge type which can be set in or out for a wider gauge in the full line position of FIGURE 1 and set in for narrow gauge operation in the broken line position.

The front axle assembly 27 includes a center portion 29 pivotally mounted on a longitudinal pivot (not shown) adjacent the front end of the engine 11 and a pair of side axle portions 30 and 31 which support the front wheels 32, 32 of the tractor. The front axle assembly is generally similar to that shown in Farmer Patent 2,507,000 and permits the axle assembly 27 to be shortened or lengthened to move the front wheels 32 inward and outward to correspond with the gauge setting of the rear wheels 22, 22.

The front wheels 32, 32 are steered by a steering mechanism including a steering wheel 34 and steering shaft 35 which are axially displaced to the right of the axis 15 of the engine and transmission, the steering shaft 35 being inclined downwardly at the right of the engine and, operating through a conventional type of steering gear, not shown, actuates a pair of radius rods 36, 36 connected with steering arms 37, 39 on the front spindle assemblies 40 and 41.

The implement hitch, which is of the three-point, hydraulic lift type comprises a pair of lower draft links 42, 42, and a top link 44 located above and midway between the lower links. The hitch is displaced to the right of the axis 15 of the engine, transmission and center housing, being centered with respect to the outer ends 19 and 20 of the rear housing. The forward end of the left link 42 is mounted for limited universal movement on a pin 45 received within a hanger 46 mounted on the underside of the center housing 14. The forward end of the right lower link 42 is mounted for limited universal movement on a pin 45 at the lower end of a hanger or strut 47 projecting downwardly from the right-hand axle housing 17. Preferably, the hanger 47 has a forwardly projecting portion 49 abutting the underside of the housing and a bracket 50 on the upper side of the housing is engaged with the upper end of the hanger. The portion 49 of the hanger and the bracket 50 are engaged with a mounting pad 51 of the axle housing.

The forward end of the top link 44 of the tractor is carried by a pin 52 received within a hydraulic lift rocker 54. The lower end 55 of the rocker 54 is pivotally mounted on a transversely extending pin 56 supported by a lug 57 cast integral with the center housing 14 and a bracket 59 secured to a mounting pad 60 formed on the inner end portion of the right-hand axle housing 17 and projecting rearwardly to a position opposite the mounting pad 60.

The tractor hydraulic lift mechanism comprises a lift cover 61, on the underside of which a lift cylinder 62 is supported. A piston, not shown, within the cylinder 62, operates a rock shaft 64 journaled within the lift cover 61. Left and right lift arms 65 and 66 are mounted on the ends of the rock shaft 64 and are connected with intermediate portions of the lower links 42, 42 by lift links 67 and 69. The left lift arm 65 has a central aperture 68 in order to clear a boss 73 on the center housing 14. This hydraulic lift assembly is generally similar to that shown in Roeder Patent 2,631,514 and will not be described in detail.

The hydraulic lift assembly, including the lift cover 61 and associated parts, is supported in its offset position at the right of the center housing 14 by a housing or support 70 having a body portion 71 receiving the margin of the lift cover 61 and enclosing the lift cylinder 62 and associated parts. A laterally extending portion 72 of the housing 70 serves as a cover for an opening 74 in the top of the center housing 14 normally provided for receiving the lift cover 61. Preferably, the portion 72 is somewhat thicker and stronger adjacent body portion 71 to withstand the forces concentrated at this zone during operation of the hydraulic system, and is tapered towards the opposite edge of the cover portion.

Hydraulic oil supply and return lines 75 and 76 are provided for supplying hydraulic oil under pressure to the lift cylinder 62. These lines are incorporated in an adapter assembly 77 including a plate 79 adapted to be bolted to the lift cover 61 and a plate 80 adapted to be bolted to the top surface of the hydraulic lift support 70. The connection of the plate 80 to the support 70 and the connection of the support to the center housing 14 is such as to connect with oil passages, not shown, for supply and return of hydraulic fluid provided in the center housing and communicate such passages with passages within the lift cover 61. In addition, an oil drain tube 81 extends from the bottom of the body portion of housing 70 to the center housing 14 to drain back to a sump located within the center housing 14 any hydraulic oil which may leak from the lift cylinder 62.

When the tractor is in draft control, operation of the hydraulic lift mechanism previously described is accomplished by compression on the top link 44 which presses the hydraulic lift rocker 54 forwardly, the upper end of the rocker 54 being pivotally connected with a draft control rod 82 extending within the lift cover 61 and operating a valve, not shown, for controlling admission of hydraulic fluid to, and drainage of hydraulic fluid from, the lift cylinder 62. A spring 84 surrounding the rod 82 is compressed by forward movement of the rod to resist its forward movement. This arrangement is more or less conventional in hydraulic lift systems of the three-point hitch type.

Left and right stabilizer links 85 are provided to restrict lateral swinging movement of the lower draft links 42, 42. The links 85 extend between intermediate portions of the draft links and brackets 87 secured to the drop housings 21, 21 at the outer ends of the rear axle housing. If desired, a round hole 89 and also a longitudinal slot 90 may be provided at one end of each of the stabilizer links to provide alternatively for either locking the lower draft links 42 against all lateral swinging or permitting limited lateral swinging.

A weight 91 is mounted on the right-hand drop housing 21. This weight serves to more or less compensate for the offset of the axis 15 of the tractor so as to provide for generally equal weight on both rear wheels 22 and provide balanced traction for driving and braking. The weight 91 is shaped to permit the right wheel 22 to be moved inwardly fully without interfering with the weight.

A longitudinal drawbar 92 may be located directly below a PTO shaft 94 of the tractor, which is centered in the rear face of the center housing 14 in the customary manner. The hanger 46 is provided with a rectangular opening 95 to receive the forward end 96 of the drawbar and a pin 97 extending through the hanger and drawbar retains the drawbar. A vertically extending plate 99 secured to the rear face of the center housing 14 about the PTO shaft 94 may be apertured to receive the drawbar 92 so as to retain it against swinging in accordance with industry standards.

A seat 100 may be supported on a U-shaped bracket 101 mounted on the lift cover 61. The seat and mounting are generally similar to that shown in Roeder et al. Patent 2,563,277 and need not be described in detail. As indicated in FIGURE 1, the seat is offset to the right from the axis 15 of the engine, transmission and center housing and is centered behind the steering wheel 34. A running board 102 may be mounted on the right side of the transmission 12 and center housing 14 below the steering wheel, control pedals 104 being provided at the front end of the running board of the tractor.

A hydraulic control quadrant 105 is provided at the right of the lift cover 61 for control of and operation of the hydraulic lift assembly. The quadrant 105, which is generally similar to that shown in Roeder Patent 2,631,514, may be more or less conventional and need not be described herein.

The above described tractor provides the visibility for one-row crop cultivation of the conventional offset tractor and at the same time provides a tractor with a three-point hitch which is centered with respect to the rear wheels of the tractor. At the same time, the tractor of the present invention incorporates, insofar as practical, tractor parts identical to those found in conventional tractors in which the engine, transmission and center housing are not offset and the three-point hitch is centered on the center housing.

What is claimed is:

1. In an offset tractor having a center housing and rear axle housings of unequal length extending laterally from opposite sides of the center housing, the center housing having an opening in the top thereof and forming a sump for hydraulic oil, a hydraulic lift assembly positioned beside the top portion of the center housing and including a lift cover and a hydraulic cylinder mounted on the underside of the lift cover, and a body forming a cover closing the opening in the top of the center housing and projecting laterally of the center housing and forming a second housing provided with an opening receiving the hydraulic cylinder, the lift cover being secured to the body about the margin of the opening therein, said body supporting the lift assembly from the top of the center housing.

2. In an offset tractor having a center housing and rear axle housings of unequal length extending laterally from opposite sides of the center housing, the center housing having an opening in the top thereof and forming a sump for hydraulic oil, a hydraulic lift assembly positioned beside the top portion of the center housing and including a lift cover and a hydraulic cylinder mounted on the underside of the lift cover, and a body forming a cover closing the opening in the top of the center housing and projecting laterally of the center housing and forming a second housing provided with an opening receiving the hydraulic cylinder, the lift cover being secured to the body about the margin of the opening therein, said body supporting the lift assembly from the top of the center housing, and a hydraulic oil drain line extending from the bottom of the second housing to the center housing.

3. In an offset tractor having a center housing and rear axle housings of unequal length extending laterally from opposite sides of the center housing, the center housing having an opening in the top thereof and forming a sump for hydraulic oil, a hydraulic lift assembly positioned beside the top portion of the center housing and including a lift cover and a hydraulic cylinder mounted on the underside of the lift cover, and a body mounted on the top of the center housing and projecting laterally of the center housing and forming a second housing provided with an opening receiving the hydraulic cylinder, the lift cover being secured to the body about the margin of the opening therein.

4. In an offset tractor having a center housing and rear axle housings of unequal length extending laterally from opposite sides of the center housing, the center housing having an opening in the top thereof and forming a sump for hydraulic oil, a hydraulic lift assembly positioned beside the top portion of the center housing and including a hydraulic lift cylinder, and a body forming a cover closing the opening in the top of the center housing and projecting laterally of the center housing and forming a housing enclosing the hydraulic cylinder, said body supporting the lift assembly from the top of the center housing.

5. In an offset tractor in which the engine, transmission and center housing are in line and rear axle housings of unequal length extend laterally from the center housing; a tractor hitch of the three-point-hitch type including a rearwardly extending lower draft link pivotally mounted under the center housing, a hanger projecting downwardly from an intermediate portion of the longer rear axle housing, a second, rearwardly extending lower draft link pivotally mounted on the lower end of said hanger, and a hydraulic lift assembly mounted beside the top portion of the center housing and above and in front of the inner end of the longer rear axle housing, the lift assembly being generally centered between the draft links, and lift links connecting the lift assembly with the draft links.

6. In an offset tractor in which the engine, transmission and center housing are in line and rear axle housings of unequal length extend laterally from the center housing; a tractor hitch of the three-point-hitch type including a rearwardly extending lower draft link pivotally mounted under the center housing, a hanger projecting downwardly from an intermediate portion of the longer rear axle housing, a second, rearwardly extending lower draft link pivotally mounted on the lower end of said hanger, and a hydraulic lift assembly mounted beside the top portion of the center housing and above and in front of the inner end of the longer rear axle housing, the lift assembly being generally centered between the draft links, lift links connecting the lift assembly with the draft links, a rocker mounted beside the rear end of the center housing for rocking movement on a transverse axis, a top link pivotally connected with the rocker, the top link and rocker being centered between the lower draft links, and actuating means connecting the rocker with the hydraulic lift assembly.

References Cited in the file of this patent

UNITED STATES PATENTS

| | | |
|---|---|---|
| 2,375,026 | Mott | May 1, 1945 |
| 2,416,207 | Olson | Feb. 18, 1947 |
| 2,420,530 | Evans | May 13, 1947 |
| 2,515,637 | Dooley et al. | July 18, 1950 |
| 2,519,228 | Court | Aug. 15, 1950 |
| 2,650,529 | Tanke | Sept. 1, 1953 |
| 2,678,596 | Todd | May 18, 1954 |
| 2,765,746 | Omon | Oct. 9, 1956 |
| 2,800,848 | Holden | July 30, 1957 |
| 2,900,030 | Edman | Aug. 18, 1959 |